United States Patent Office 3,162,634
Patented Dec. 22, 1964

3,162,634
2-METHYL-3-(2'-METHYL-3'-CHLORPHENYL)-QUINAZOLONE-(4)
Josef Klosa, 13 Janickestrasse, Berlin-Zehlendorf, Germany
No Drawing. Filed Oct. 13, 1961, Ser. No. 144,834
3 Claims. (Cl. 260—251)

The present invention relates to new quinazolone derivatives having a sedative and hypnotic action. The general formula of these derivatives is:

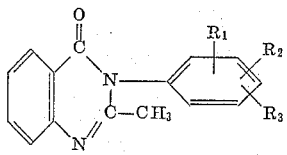

in which $R_1$ is selected from hydrogen and methyl, $R_2$ is selected from hydrogen, methyl, methoxy and nitro, and $R_3$ is selected from methyl, chlor, nitro and methoxy.

The described quinazolone derivatives are useful as sedatives and hypnotics. 2-methyl-3-orthotolyl-4-quinazolone is described in British Patent 843,073, and also elsewhere, as having hypnotic properties. However, the compounds of the present invention have a lower toxicity and stronger activity. In addition, they have a much more desirable activity since a certain stimulant activity of 2-methyl-3-orthotolyl-4-quinazolone at certain elevated dosage levels is not characteristic of the presently described compounds, which are, as a consequence, vastly superior in assuring an undisturbed, uninterrupted sleep. The following Tables I and II provide comparative data.

TABLE I

| No. | $R_1$ | $R_2$ | $R_3$ | $LD_{50}$, mg./kg. | Hypnotic dose in mg./kg. | | Stimulant dose |
|---|---|---|---|---|---|---|---|
| 1 | 2-methyl-3-o-tolyl-4-quinazolone | | | 400 | 80 | + | |
| 2 | H | 2-$CH_3$ | 6-$CH_3$ | 1,400 | 300 | 0 | |
| 3 | H | H | 2-Cl | 1,100 | 50 | + | |
| 4 | H | 2-$CH_3$ | 6-Cl | 1,600 | 150 | 0 | 600 |
| 5 | H | 2-$CH_3$ | 4-Cl | 1,000 | 150 | + | 500 |
| 6 | H | 4-$CH_3$ | 3-Cl | 2,200 | 50 | + | 600 |
| 7 | H | 2-$CH_3$ | 3-Cl | 1,300 | 40 | + | |
| 8 | H | 2-$OCH_3$ | 5-Cl | 1,000 | 300 | 0 | |
| 9 | H | 4-$OCH_3$ | 5-Cl | 550 | 400 | 0 | |

TABLE II

| No. | $R_1$ | $R_2$ | $R_3$ | Hypnotic Activity |
|---|---|---|---|---|
| 1 | 2-methyl-3-o-tolyl-4-quinazolone | | | 1 |
| 10 | H | 2-$CH_3$ | 4-$NO_2$ | 4 |
| 11 | H | 2-$CH_3$ | 5-$NO_2$ | 1.5 |
| 12 | H | 4-$CH_3$ | 2-$NO_2$ | 5 |
| 13 | H | 2-$OCH_3$ | 4-$NO_2$ | 4 |

In the pharmacological experiments the compounds were used as the hydrochlorides. The $LD_{50}$ (acute toxicity) was determined orally in white mice. In the course of these investigations, the animals reacted either with sleep or excitement, or not at all. The sedative activity was determined with white mice which previously received a dose of 100 mg./kg. of caffein. The activity of the compounds was determined in a jitter-cage.

From the results it is clear that compounds numbered 2, 4, 8 and 9 and have no sedative activity. In fact, there was no activity whatsoever even in high doses, with the exception of compound 4. Compounds 5, 6 and 4, which are isomers of compound 7 (the compound with the best activity in the series), do induce sleep, but in higher doses there is evident a strong stimulating activity. Such compounds are not ideal hypnotics. It is surprising that compound 7, which is an isomer of compounds 4, 5 and 6, does not demonstrate such stimulating activity, but on the contrary the sedative action of this compound 7 is stronger and the toxicity much less than the previously known compound 1. Indeed, the therapeutic index $$(LD_{50}/HD_{50} = \text{lethal dose}_{50}/\text{hypnotic dose}_{50})$$

is 5 for compound 1 and 32.5 for compound 7, evidencing very vividly the superior therapeutic properties of compound 7. The therapeutic index for compound 7 is more favorable than that of the barbiturates.

Compounds 2–9 were also tested by the "rotating rod" method with white mice. The animals were given a dose of 50 mg./kg. of the compound to be tested, and then placed on a rotating rod. The more animals that fall off the rod within 120 seconds, the more active the compound may be regarded. In this case, "activity" is relative to hypnotic and sedative activity. The results were as follows:

TABLE III

| Compound No. | Percentage of Activity | Activity persisted over—minutes (experiments repeated every 30 minutes) |
|---|---|---|
| 1 | 0 | 90–120 |
| 2 | 0 | 90–120 |
| 3 | 60 | 30–120 |
| 4 | 35 | 30–120 |
| 5 | 45 | 30–120 |
| 6 | 45 | 30–180 |
| 7 | 90 | 30–180 |
| 8 | 0 | 30–120 |
| 9 | 0 | 30–120 |

It is significant that compound 1 had no effect at all at the given dosage level, while compound 7 proved, once again, to be surprisingly active. Thirty other quinazolone derivatives were included in this experimentation but none were as active as those listed in Tables I and III. Compound 7 was also tested for its effect on circulation, heart, blood pressure and respiration. Feeding it to rats over a period of four months failed to produce any other but the sedative-hypnotic activity, depending upon the dose, the higher dose inducing the hypnotic activity.

Regarding compounds 10–13 listed in Table II, their hypnotic activity is compared with that of compound 1 (by arbitrarily assigning an activity of 1 to compound 1). While the nitro group leads normally to toxic products, these compounds are surpringly less toxic than compound 1, even though their hypnotic activity is up to five times as great. This was also confirmed in experiments with humans, since doses of 30–50 mg. were enough to induce sleep, when 200 to 600 mg. were required for like effect when compound 1 was employed.

The compounds of this invention may be prepared by more than one method. Acetanthranil may be heated, for instance, with the properly substituted aniline to yield the desired compounds in yields of up to 75%. More economical, and indeed the preferred method, is to react acetylanthranilic acid with the corresponding aniline in the presence or absence of an inert solvent, such as toluol, with heating, employing a dehydrating agent such as phosphorus trichloride or phosphorus oxychloride. Isatoic anhydride, when heated with the properly substituted aniline, yields the required anthranilic acid amide, which, in turn, yields the desired quinazolones upon heating with acetic anhydride.

The process of preparing the subject quinazolones may be further illustrated by the following examples.

Example 1

179 gms. N-acetylanthranilic acid are suspended in 4–500 ml. toluol and 141 gms. 2-methyl-3-chloraniline are added. After stirring the mixture for a few minutes, and under continued stirring, 150–160 ml. phosphorus oxychloride are slowly added. The mixture is heated to 80–90° C. After about thirty minutes, there is a strong development of hydrochloric acid and then an oily layer separates. The heating is continued for another 30 to 40 minutes and then the mixture is cooled. The solid which formed on cooling (which consists of the phosphates and chlorides of compound 7) is separated from the toluol and is dissolved in 600 ml. boiling hot water to which 100 ml. concentrated hydrochloric acid has been added. The solution is boiled for about a half an hour in the presence of charcoal, filtered and cooled. The hydrochloride of 2-methyl-3-(2'-methyl-3' - chlorphenyl) - quinazolone-(4) (compound 7) crystallizes. M.P. 244–246° C. It may be recrystallized from alcohol to which some hydrochloric acid has been added.

Example 2

9 gms. N-acetylanthranilic acid are suspended in 25–30 ml. toluol and 7.4 gms. 3-nitro-4-aminotoluol are added. Slowly, under stirring and heating, 6 ml. phosphorus oxychloride are added. Hydrochloric acid gas develops. The heating is continued for 30 minutes. The mixture is now present in two layers, a resinous lower layer and the upper toluol layer. The toluol is decanted and the residue (which consists of the phosphates and chlorides of compound 12) is dissolved in 50 ml. water to which 4–6 ml. hydrochloric acid have been added. Upon cooling, a yellow crystalline material is obtained which may be recrystallized from alcohol or alcohol-water (1:1). This is the hydrochloride of 2-methyl-3-(2'-nitro-4'-methyl-phenyl)-quinazolone-(4) (compound 12). M.P. 213–215° C. The yield is 85%.

The following compounds were prepared in the same manner by using the process of Example 2 and by varying the reactants to obtain the desired compound:

| No. | $R_1$ | $R_2$ | $R_3$ | Melting Point of the Hydrochloride, degrees |
|---|---|---|---|---|
| 14 | H | 2-methyl | 4-nitro | 262–264 |
| 15 | H | 2-methyl | 5-nitro | 228–230 |
| 16 | H | 2-nitro | 4-methyl | 213–215 |
| 17 | H | 2-nitro | 4-OCH$_3$ | 203–205 |
| 18 | H | 2-OCH$_3$ | 5-nitro | 233–235 |
| 19 | H | 2-OCH$_3$ | 4-nitro | 240–242 |
| 20 | H | 2-Cl | 4-NO$_2$ | 232–234 |
| 21 | 2-CH$_3$ | 4-NO$_2$ | 5-Cl | 240–242 |

The foregoing is to be considered as generally and particularly descriptive of the nature and scope of the present invention without being exhaustive.

What is claimed is:

1. A compound selected from the group consisting of 2-methyl-3-(2'-methyl-3' - chlorphenyl) - quinazolone-(4) and the non toxic acceptable acid addition salts of 2-methyl-3-(2'-methyl-3'-chlorphenyl)-quinazolone-(4).

2. 2-methyl-3-(2'-methyl-3'-chlorphenyl) - quinazolone-(4).

3. 2-methyl-3-(2'-methyl-3'-chlorphenyl) - quinazolone-(4)·HCL.

References Cited by the Examiner
UNITED STATES PATENTS

| | | | |
|---|---|---|---|
| 2,915,521 | 12/59 | Laubach et al. | 260—251 |
| 3,039,930 | 6/62 | Gray | 167—65 |
| 3,048,520 | 8/62 | McKennis et al. | 167—65 |
| 3,060,090 | 10/62 | Becker | 260—251 |

OTHER REFERENCES

Jackman et al.: J. Pharm and Pharmacol, vol. 12 (1960), pages 520–38.

Serventi et al.: Chem Abstracts, vol. 52 (1958), 9147a (abstr. of Boll. Sci. prac. chim. ind Bologna 15 (1957).

Seshavataram et al.: Chemical Abstracts, vol. 53 (1959), col. 18,045i (abstr. of Proc. Ind. Acad. Sci. 49A (1959)).

Subbaram: Chem. Abstr. volume 49 (1955), page 11665c (abstract of Proc. Indian Acad. Sci. 40A (1954), pages 22–4).

IRVING MARCUS, *Primary Examiner.*

NICHOLAS S. RIZZO, WALTER A. MODANCE, *Examiners.*